United States Patent [19]

Soupert et al.

[11] Patent Number: 5,341,540
[45] Date of Patent: Aug. 30, 1994

[54] PROCESS AND AUTONOMOUS APPARATUS FOR THE AUTOMATIC CLEANING OF GROUND AREAS THROUGH THE PERFORMANCE OF PROGRAMMED TASKS

[75] Inventors: Jean-Louis D. C. Soupert; Joël O. P. Poujon, both of Marseilles, France

[73] Assignee: Onet, S.A., Marseilles Cedex, France

[21] Appl. No.: 778,128

[22] PCT Filed: Jun. 6, 1990

[86] PCT No.: PCT/FR90/00398

§ 371 Date: Dec. 6, 1991

§ 102(e) Date: Dec. 6, 1991

[87] PCT Pub. No.: WO90/14788

PCT Pub. Date: Dec. 13, 1990

[30] Foreign Application Priority Data

Jun. 7, 1989 [FR] France .................. 89 07758

[51] Int. Cl.[5] .................................... B62D 11/04
[52] U.S. Cl. ......................... 15/319; 15/320; 180/169
[58] Field of Search ............... 15/302, 317, 320, 321; 180/167, 6.28

[56] References Cited

U.S. PATENT DOCUMENTS

| | | |
|---|---|---|
| 3,713,505 | 1/1973 | Muller . |
| 3,952,361 | 4/1976 | Wilkins ................... 15/319 |
| 4,500,970 | 2/1985 | Daemmer ............... 180/168 |
| 4,588,041 | 5/1986 | Tsuchihashi ........... 180/168 |
| 4,700,427 | 10/1987 | Knepper ................ 180/169 X |
| 4,777,416 | 10/1988 | George, II . |
| 4,782,550 | 11/1988 | Jacobs . |
| 4,829,442 | 5/1989 | Kadonoff . |
| 5,052,799 | 10/1991 | Sasser et al. ........... 180/168 |

FOREIGN PATENT DOCUMENTS

| | | |
|---|---|---|
| 2251271 | 3/1974 | Fed. Rep. of Germany ........ 15/319 |
| 1-307808 | 12/1987 | Japan .................... 180/167 |
| 2213047 | 12/1987 | United Kingdom . |

OTHER PUBLICATIONS

Robotics Age, vol. 7, No. 4, Apr. 1985, pp. 29–32, Peterborough, N.H., US: H. R. Everett: "A . . . Robot".
Proceedings 1988 IEEE Int'l. Conference on Robatics & Automation, PA, 24–29 Apr. 29, 1988, pp. 1839–1841; IEEE, N.Y.

Primary Examiner—Frankie L. Stinson
Attorney, Agent, or Firm—Ladas & Parry

[57] ABSTRACT

An autonomous apparatus for automatically cleaning ground areas including various cleaning tools and a control mechanism for directing the apparatus along a prescribed path over a preselected area to be claimed in response to the execution of a series of instructions stored in a computer memory or the apparatus. The control mechanism includes a sensor for detecting proximity of the apparatus to a fixed reference point for initiating execution of the series of instructions, and a positioning system for determining the instantaneous position of the apparatus relative to fixed reference beacons.

10 Claims, 3 Drawing Sheets

PROCESS AND AUTONOMOUS APPARATUS FOR THE AUTOMATIC CLEANING OF GROUND AREAS THROUGH THE PERFORMANCE OF PROGRAMMED TASKS

The present invention has for its object a process and autonomous apparatus for automatic cleaning of ground areas through the performance of programmed tasks.

The technical sector of the invention is the manufacture of robots for cleaning ground areas, rolling and being positioned thereon to perform the cleaning operations in accordance with a determined task.

One of the principal applications of the invention is the automatic and autonomous sweeping, with slight suction, of ground areas in all premises recognized previously, whatever the obstacles which may be located in these premises and with a minimum of supervision and intervention by the operator.

In fact, various devices and processes for cleaning ground areas and walls in manual and automatic mode are known. In fact, with the development of techniques, on the one hand, and the wish to improve and to protect the environment, on the other hand, our Society is more and more demanding in matters of cleanliness; manual cleaning operations being degrading for the personnel and requiring much manpower, are being carried out more and more by tools mounted on machines or supports piloted by operators; for example, motor-cycles and automobiles for cleaning pavements and highways, telescopic elevators for cleaning facades, brush-/vacuum cleaner carriages for cleaning ground areas, etc... have been developed. All these systems are generally autonomous and require the presence of at least a technician operator for piloting it in its environment, guiding it to the places where it must intervene, and for triggering off the cleaning tools proper.

For known premises or surfaces, certain manufactures even propose eliminating the operator on the apparatus itself, mounting thereon remote-control equipment controlled either remotely by an operator situated at a control station or by a pre-recorded program which causes it to perform repetitive tasks, always in the same manner.

Patent Application FR 8608026 filed on Jun. 4, 1986 by the firm HYPERROBOTICS INC. in the USA and entitled "robot for upkeep of buildings", may for example be mentioned, describing a structure for cleaning by surface spraying and scraping which moves by sliding from a garage station from which it is controlled by a linking cable.

Patent Application filed on Jan. 11, 1982 under No. FR 82 00275 by the firm "INTERNATIONAL ROBOTIC ENGINEERING" and entitled "robot with climbing attachments" is also known, comprising a frame which may abut on jacks provided with suction cups and moving by translation and rotation over all surfaces to be upkept. Others, each responding to a specific need of accessibility and/or of repetition of tasks, may be mentioned.

In the domain of cleaning ground areas, the problems of accessibility are less critical and automatization is still little developed: the operator remains necessary on the majority of present machines even if he has at his disposal an autonomous machine which comprises tools which do not manoeuvre directly and which he actuates by acting on control knobs; automatization is therefore partial as it is, in fact, difficult to render it total for ground areas of premises which may be temporarily occupied by unexpected obstacles, which do not comprise a mechanical permanent guiding system and of which the course is never the same when it is desired to use the same apparatus for several premises. Various prototype apparatus have been produced in an attempt to respond to these particularities, but, at the present time, none has succeeded.

The problem raised is therefore that of being able to displace and operate the ground cleaning tools without direct intervention of the operator in automatic mode and in autonomous manner in all premises, whatever the obstacles which may be encountered, without permanent mechanical installation or other guiding ones, and performing several different successive tasks.

One solution to the problem raised is a process for automatically cleaning ground areas with an autonomous apparatus of the type comprising known tools adapted to said cleaning, means for propulsion and steering by wheels, an electrical supply by on-board battery, various converters and relays, and control levers allowing functioning of said tools and said propulsion and steering means, which apparatus is covered with a protective streamlined body and comprises: an electronic system of the micro-computer type comprising at least one microprocessor, a fixed read-only memory, an erasable memory and various input/output interface cards connected in particular to the various components allowing operation and actuation of said tools and propulsion and steering means, fixed sensors for checking the distance to the obstacles and at least one initialization sensor, which sensors are connected to at least one of said input/output cards. The process according to the invention is in that case:

said control levers are grouped on a console placed on the apparatus and provided with a display and a keyboard, said console is connected to an input/out put card specific of said microprocessor and said ready-only memory is loaded with a program ensuring, on the one hand, permanently and in known and automatic manner, the management of all the input/output interface cards and of all the equipment connected to said cards, and, on the other hand, when required and successively, in several places and for different tasks, one of the following operations:

from a fixed reference point on which said initialization sensor is set, said apparatus is manually directed by these control levers through the electronic system so as to cause it to follow a given path over the ground area to be cleaned, with actuation of the appropriate tools, and each specific point of this path, such as change of direction, of speed, starting and stopping of tools and change of mode, is progressively recorded in said erasable memory of said microprocessor.

at the end of this manual learning, said apparatus is replaced so that said initialization sensor is reset on a fixed reference point and the apparatus is then made to effect, in automatic mode, the displacements and operations of a cleaning such as memorized and along a recorded path.

during this phase of execution, the environment of the apparatus is permanently scrutinized in known manner thanks to said fixed distance monitoring sensors, any obstacle which appears and which was not there during the learning phase is then detected and if it hinders performance of the operations, the apparatus is stopped and an avoidance procedure may be carried out.

at any moment during this phase of execution, said apparatus may be returned to the initial fixed reference point in manual mode and either be made to recommence the same recorded task of cleaning along the learnt path, or to perform another cleaning task to be recorded previously, in accordance with the same process.

In a preferred embodiment, said apparatus is equipped with a known positioning system and marking beacons compatible with said positioning system are placed at fixed reference points, located near the ground area to be cleaned.

said beacons are interrogated at given intervals and at each said specific point of the learning phase, and each position of the specific points located in this way is recorded in said erasable memory, simultaneously with the information concerning the cleaning operation underway.

during the phase of execution, the real position at any instant of the apparatus with respect to the same beacons is compared with that calculated theoretically from the positions of the specific points recorded during the same cleaning operation, and the displacement of the apparatus is corrected if the positions are different so as to reset the latter on the real theoretical path recorded.

Another solution to the problem raised is an autonomous apparatus for automatically cleaning ground areas, comprising a support frame of the type comprising known tools adapted to said cleaning, means for propulsion and steering by wheels, an electrical supply by on-board battery, various converters and relays, and control levers allowing operation of said tools and said propulsion and steering means, which apparatus is covered with a protecting streamlined body; this apparatus further comprises an electronic system of micro-computer type composed of at least one micro processor, a fixed read-only memory, an erasable memory and various input/output interface cards connected in particular to the various components allowing operation and start-up of said tools and propulsion and steering means, fixed distance monitoring sensors and at least one initialization sensor, which sensors are connected to at least one of said input/output cards and are placed on said protecting streamlined body, a console provided with a display and a keyboard, grouping said control levers, and connected to an input/output card specific of the microprocessor, which read-only memory of the electronic system is loaded with a program ensuring, on the one hand, permanently and in known and automatic manner, the management of all the input/output interface cards and of all the equipment connected to said cards and, on the other hand, as required and successively in several places and for different tasks, a learning phase by memorization of a cleaning task performed manually in a first step, then a phase of execution by repetition of this recorded cleaning task, and this automatically even in the case of unexpected obstacle detected by said distance monitoring sensors and from the, same reference point on which said initialization sensor is reset at the beginning of each execution of the same task on the same learnt path.

In a preferred embodiment, said learning phase is recorded in an erasable memory located in an interchangeable recording support; in that case, said support may be changed and as many tasks each corresponding to a ground area and to a given type of cleaning, chosen by the operator, may be recorded on other supports.

The result is novel processes and autonomous devices for automatically cleaning ground areas for performance of programmed tasks, of which the characteristics make it possible to satisfy the imperatives of all these tasks whatever the disturbances that may intervene in the course thereof. In fact, the combination on the same machine of the various equipment and processes of which certain are furthermore known and developed elsewhere as described hereinafter, enables said machines to be adapted to any arrangement of ground areas without programmation and equipment peculiar thereto; in particular, learning by prior guiding with an operator is sufficient to allow thereafter the reproduction of the course and the performance of the cleaning manoeuvres proper in automatic mode, which considerably simplifies adaptation of the machine to any premises and does not require a specialized operator.

Moreover, the possibility of recording this learning in interchangeable memories ensures a limitless adaptability by changing these memories.

Furthermore, optional referencing of the machine by any absolute positioning systems linked with the premises allows the machine to be permanently reset therein, and therefore to perform its mission by respecting its course even if there are parasitic mechanical drifts which can never be eliminated: moreover, this has been a brake to any development of this type of robot which, after a few minutes of operation, was lost outside its programmed course, which limited its interest as it required a monitoring operator to replace it on its path at regular intervals.

Another interest is that, even if, after the learning phase, new obstacles are placed on the course of the apparatus, the latter, thanks to the process and to the device of the present invention, may avoid it and be replaced on its path once avoidance has been effected, and this without intervention of the operator.

In this way, all these devices and processes, each bringing some advantages and there are others, such as in the following description, are complementary of one another and, in the absence of one of them, the operations could not be performed correctly without frequent appeal to a controller operator, which then reduces the interest of such fairly expensive equipment: the prices thereof are in fact justified and can be amortized for a consumer only if the presence of personnel is sufficiently reduced, if not eliminated to allow one person to operate and follow a plurality of apparatus at a time, in that case increasing the simultaneous cleaning yields and capacities.

In the following description, we are essentially describing an example of process and device according to the invention in particular in the application to the cleaning of ground areas with a machine comprising known tools and equipment, but other tools and equipment and applications may be envisaged: the drawings, figures and description hereinafter have no limiting character.

FIG. 4 is an example of path and of task learnt by the apparatus and re-performed when required to.

Figure 1:
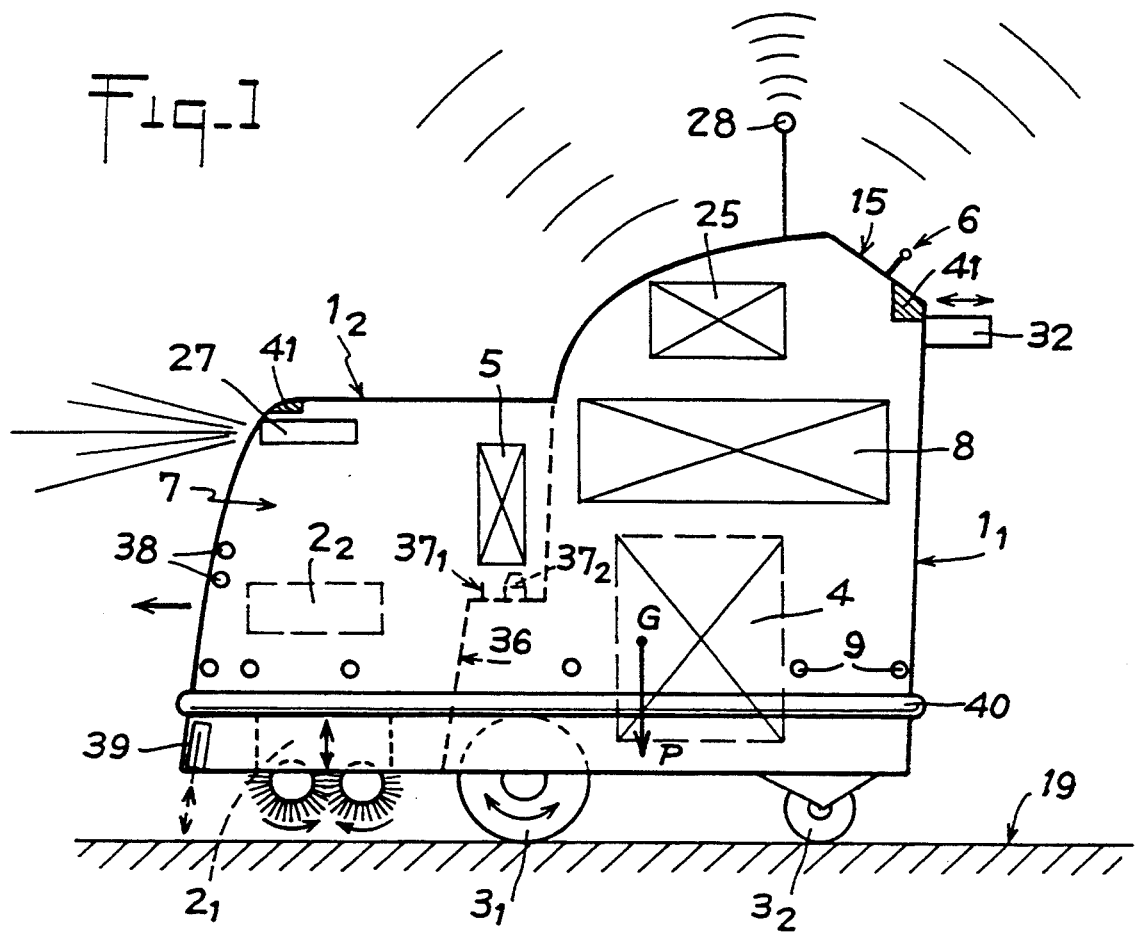
FIG. 1 is a schematized side view of an example of apparatus according to the invention.
Figure 2:
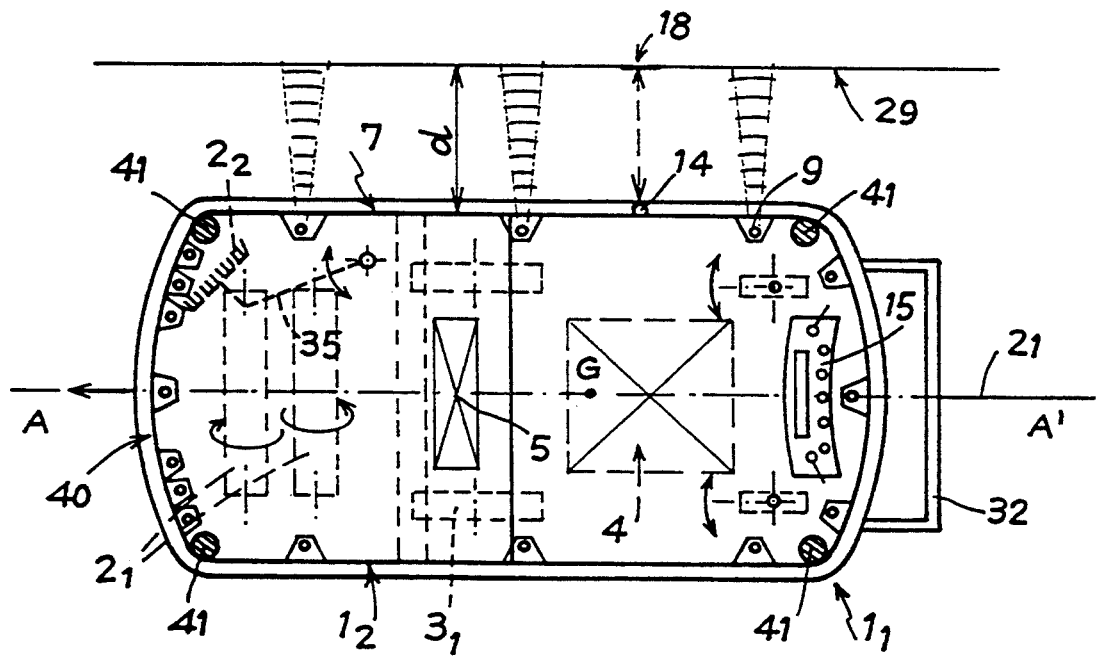
FIG. 2 is a plan view of the same apparatus along a wall.

FIG. 1 is a schematized side view of an example of an autonomous apparatus 1 for automatically cleaning ground area 19 thanks to various known specialized tools 2 such as including at least one central rotating brush $2_1$, a lower suction means and a lateral brush $2_2$ mounted on an extensible arm allowing its development on one of the sides of the apparatus as indicated in FIG. 2. These tools are controlled in positioning then in operation, such as rising or descending for the ventral tool $2_1$, start-up for suction and sweeping, in extension and in rotation for the lateral brush, through an interface card of an electronic system 8 described hereinafter and relays 5 supplied by an on-board battery 4. The assembly of these tools 2, on the one hand, and of the drive motors, electrical, electronic supply and control equipment on the other hand, are mounted on at least 2 frames or chassis, covered with a streamlined body 7, in one or more parts, camouflaging the assembly of the apparatus and giving it an outside appearance which, on the one hand, is aesthetic depending on the choice of the user, and, on the other hand, functional in order to avoid risks of grazing.

In order also to avoid the risks consecutive to sudden contacts with another moving obstacle which was not detected sufficiently rapidly, or due to a blind angle, by the sensors described hereinafter, a safety belt or hoop 40 surrounds the whole apparatus, preferably in its lower part: this belt may be constituted by foam, rubber or plastic, type material in the manner of a bumper and may comprise contact sensors which, when they are stressed, make it possible to trigger off immediate stop of the apparatus.

Around this streamlined body 7 and at any height but preferably at 420 mm from ground area 19, there are disposed as a belt distance monitoring and measuring sensors 9 for detecting obstacles as described hereinafter and which may in particular be ultrasonic sensors, in a number equal to at least sixteen, with at least 3 on each lateral face and nine on the front tool-block half $1_2$ in front of the central wheels $3_1$.

On the front of the apparatus 1 and at any height from the ground area 19, it may optionally comprise a video camera 27 of any known type which makes it possible to film the space located in front of the streamlined body: this camera is connected and coupled, in known manner, on at least two automatic channels commutable in the case of disturbance on one of the channels to a wave emitter/receiver system 28, radio-compatible, working for example at 1.5 Ghz and making it possible to transmit the images taken by said camera to a monitoring station, a compatible emitter/receiver and a video monitor also being available.

An operator may thus visualize when required, in safety or in verification, what is happening in apparatus 1.

Also on the front of the apparatus 1 and at a height included between 600 and 900 mm, it comprises at least one other sensor 38 for monitoring and measuring distance, like those of belt 9, for detecting high obstacles not bearing on the ground area over the whole of their surface, such as for example tables and windows. Said sensor 38 may be one of those of belt 9 shifted, in that case, upwardly.

Moreover, still at the front, at least one sensor 39 may be disposed, which may be of the infrared type, placed and oriented beneath the apparatus towards the ground area 19 in order to detect a break therein, such as for example a down staircase, an open trapdoor or a platform: one of these sensors 39 is preferably placed at each front angle of the apparatus.

The support chassis constituting the framework of the rear part $1_1$ of the latter may be a rigid mechanowelded assembly entirely made of steel. The lower part may be made from one bent sheet which constitutes the rigid framework absorbing all the efforts and mechanical deformations, and the upper part which receives the streamlined body 7 may be constituted by angles and fine sheets.

The principal outside dimensions may be of the order of 750 mm in length, 500 mm in width and 1350 mm in height, maximum. The structure of this rear part $1_1$ rests via suspensions on four wheels 3, two driving wheels $3_1$ and two idle wheels $3_2$. The two driving wheels $3_1$ are at the front of this part and in front of the centre of gravity G of the assembly of the apparatus 1, and at the rear of part $1_2$ supporting the cleaning tools 2 proper then placed in overhang. These driving wheels are in lateral fixed planes parallel to axis AA' of the apparatus, as shown in FIG. 2: their diameter may be about 300 mm. The two idle wheels $3_2$ are placed to the rear and mounted free both on their axis of rotation and in the vertical plane, in order to be able to allow changes in direction: their diameter may be about 120 mm.

The driving wheels are driven by modular, hermetic, electric gear motor units, independent of one another and whose control at different speeds brings about changes in direction. Moreover, known systems for measuring the rotation then integration thereof allow calculation of the distance covered by each wheel, and therefore the knowledge of the orientation and instantaneous position of the apparatus 1.

The front part $1_2$ of the apparatus or tool unit fastened in overhang on the rear part $1_1$ may have dimensions in relation with those of the rear part, cited by way of example above, of about 500 mm in width, 400 mm in length and 960 mm in height, with a maximum weight for example of 50 kg.

The separation surfaces 36 between the front part or tool unit $1_2$ and the rear part $1_1$ may be in staircase form constituted for example by chassis plate with a plane step $37_1$ receiving the bearing efforts comprising a system $37_2$ for centering and retaining between the two parts, of which one contains for example at least one female part and the other a compatible male piece.

The relay assembly 5 for controlling this tool unit is then located close to this separation surface and is connected to the rear part $1_1$ only by one supply and remote-control cable; another cable allows the linkage likewise of sensors 9, 38 and 39 located on the front part and these 2 cables each comprise a disconnectable plug whose separation allows very easily that of the tool unit which is then disengaged from the rear part by raising it simply by handles on the bearing surface $37_1$. This allows a standard, modular exchange which is very rapid, either for monitoring or upkeep or to instal another tool unit comprising other functions.

In the upper rear part of the apparatus $1_1$ and possibly beneath said streamlined body 7, the apparatus may optionally comprise a known positioning system 25 compatible with fixed reference beacons located near the ground area 19, for example on pillars, ceiling or walls of a premises to be cleaned, and from which and at any moment said apparatus is positioned on said ground area 19 by interrogation of said beacons, thanks to an emission of waves compatible with the latter and the permeability of the streamlined body. Their distance to the apparatus is then calculated and consequently said position thereof is known.

Finally, in this same upper part and to the rear of the apparatus 1, the latter comprises a console 15 for control and monitoring, as described hereinafter with at least one lever 6 for controlling the motricity of steering wheels $3_1$ as well as a manoeuvring handle 32.

FIG. 2 is a plan view of the same apparatus 1 placed along a wall 29. The tool unit $1_2$ containing in particular the central brush $2_1$ is found again.

In the present configuration, this central brush is in fact constituted by two brushes $2_1$ in cylinders of horizontal axes and counter-rotating, therefore cleaning the ground area in front of the wheels and lifting up the dirt which is then sucked in a reservoir located above. These rotating brushes may for example be 30 cm long, minimum, and may preferably be of the width of the apparatus, viz. in our embodiment, 500 mm in order to increase the surface to be cleaned upon each passage and thus to improve yield.

The lateral brush $2_2$ mounted on an extensible arm 35 is shown here in retracted position. In extended position, this arm 35 is such that it ensures sweeping along said wall 29 located for example at a distance (d) of about 30 cm from the apparatus: this distance is monitored by at least 3 fixed monitoring sensors 9 located on the same side and allowing servo-control of path 21 of the apparatus such that its axis AA' remains parallel along said wall 29 and at constant distance.

In fact, in this case or whenever a path parallel and close to a wall is desired, at least the three of said fixed sensors 9 disposed on that face of said streamlined body 7 which must remain along said wall, are cyclically interrogated, the distances measured by each are noted and compared and, in the case of variation thereof with respect to one another, the steering means, which are the driving wheels $3_1$, are actuated to cancel said variation.

In the rear part $1_1$ of the apparatus, not all the principle equipment of FIG. 1 have been shown in FIG. 2. However, the on-board batteries 4 are shown, ensuring electrical supply of all the apparatus, delivering for example a voltage of 48 volts, such as 24 elements of 2 volts, allowing normal operation of the assembly for at least 4 hours, via relays, converters and/or variators 5, which are located in the front part and piloted by the electronic system described in the following Figure.

The console 15 is also described hereinafter, and the manual guide bar or handle 32 for displacing the apparatus when its motorization is stopped may take any shape: be pivotable, retractable and/or dismountable as, in normal operation, it is not necessary.

In a preferred embodiment, this manoeuvring or guiding handle 32 is retractable in the streamlined body of the rear part and is integrated in retracted position therein. A disengagement control is further associated with this handle so that, when it is pulled to disengage it from the streamlined body in order to use it to manoeuvre the apparatus manually, the driving wheels are automatically disengaged by an electrical or mechanical device or the two.

On one of the sides of the apparatus is disposed a specific initialization sensor 14 which may detect, only when said apparatus passes in front, at a given distance, a fixed reference point 18, for example located on wall 29. This sensor may be optical, infrared, and the reference point comprising an identification code recognizable by the apparatus. This allows initialization of processes according to the invention, as described hereinabove and recalled in FIG. 4. For example, the apparatus is then made to operate in automatic wall-follow mode from upstream of this point at an associated given constant distance corresponding to this initialization until the apparatus, passing in front of the reference point, then passes into recording mode or into execution mode.

At the four top corners of the apparatus and integrated in its streamlined body, there is disposed a flashing light 41 which lights up as soon as the apparatus starts to move in order to warn any person nearby of its approach.

Furthermore, the apparatus may be provided with a horn which is automatically triggered off when one of said distance monitoring sensors 9 detects an obstacle in front of it, preventing execution of its path and therefore causing the apparatus to stop. After a delay time, the programmation of the apparatus may then, if the obstacle remains, cause it to effect an avoidance procedure, but if it is question of persons, the horn and flashing lights must warn them to move away so that the apparatus can resume its path.

Figure 3:
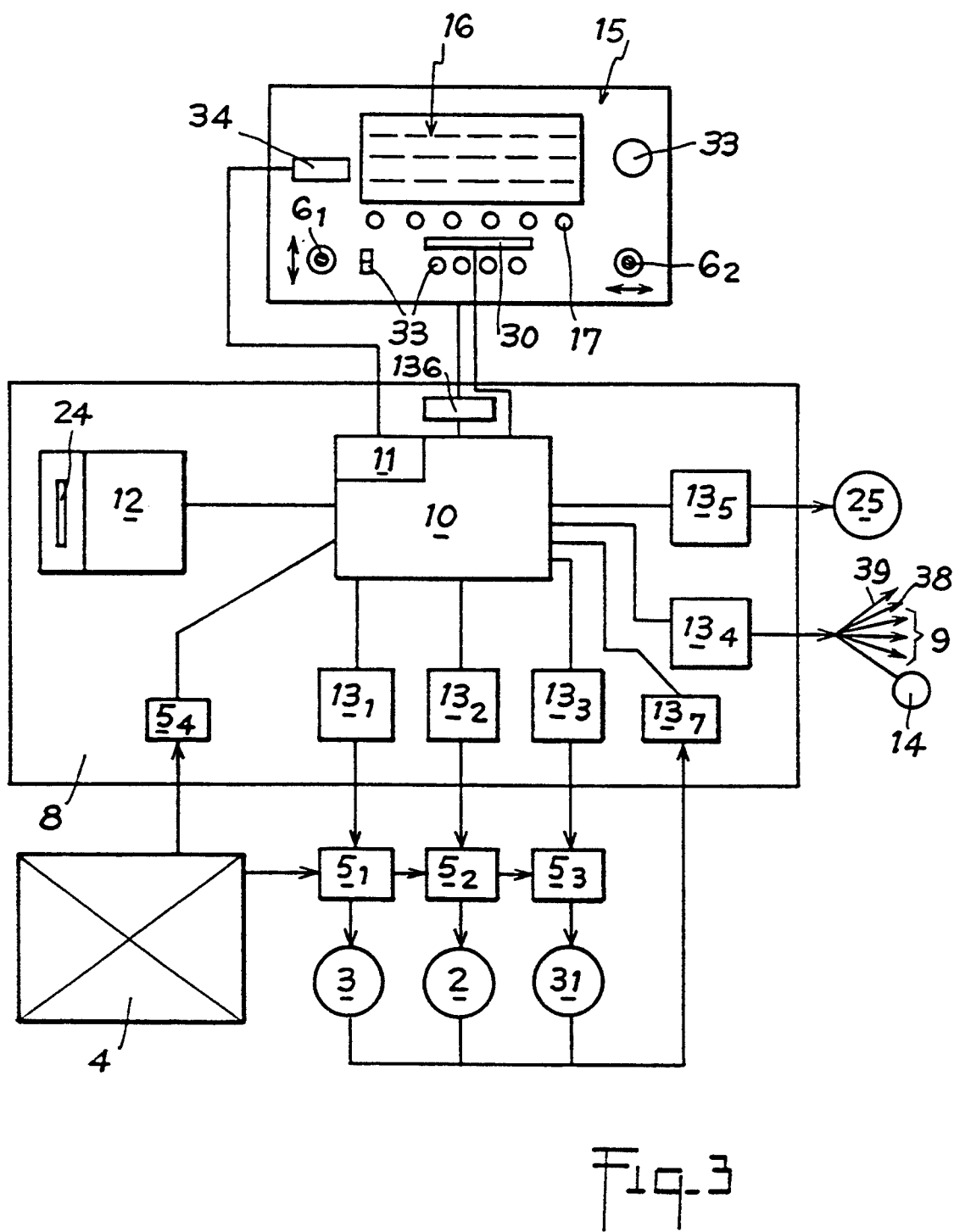
FIG. 3 is a simplified diagram of the electronic piloting system of the apparatus.

FIG. 3 is a simplified diagram of the electronic system 8 for piloting the apparatus 1 described previously and the different peripheral members thereof. This electronic system comprises in particular at least one microprocessor 10 associated with a fixed read-only memory 11 of "EEPROM" type and an erasable memory 12 of "RAM" type. It is supplied via a regulator $5_4$ by batteries 4 and may comprise its own emergency supply. Furthermore, it is connected to at least one input/output interface card 13 itself connected to all the members and components allowing functioning and start-up of the tools 2 which, in a preferred embodiment, may be eight in number, the propulsion means 3, positioning system 25, sensors 9, 38, 39 and 14, control console 15 and any safety system 31 such as the protective hoop or belt 40, flashing lights 41...

There may be one interface card per type of component as shown in the Figure and numbered from $13_1$ to $13_7$ or certain groups of components may be connected to one card, and these latter may comprise an integrated microprocessor to relieve that of the central system.

The assembly of these interface cards and memory is connected to the microprocessor 10 by one or more buses depending on the architecture retained. The power members are supplied directly by the batteries 4 via relays, variators and/or converters 5 piloted in known manner by said corresponding interface cards 13 and depending on the progress of the process according to the invention, thanks to the program contained in the memory 11 of the microprocessor 10 and of which an embodiment is described in FIG. 4 and hereinafter.

Said power members are themselves monitored by sensors returning the information of their functioning by a specific input card $13_7$.

In a preferred embodiment, said erasable memory 12 is constituted by a copy card on which is connected any interchangeable recording support 24 of diskette or magnetic cassette type or any erasable memory of RAM ("Read after memory") type so that several tasks can be recorded, transferred then reproduced for the same or for different ground areas, and each corresponding to a given type of cleaning chosen by the operator.

For simple change of said erasable memory supports in the memory of which the learning phases of said tasks have been recorded which are then transferred into memory 12, the apparatus may be made to effect each of them.

In order to obtain better understanding, diversity and possible evolution of the order and control of the apparatus, the console 15 for monitoring and controlling the apparatus comprises at least one forward and reverse operation lever $6_1$, a right and left direction change lever $6_2$, a keyboard with at least six keys for monitoring the functions of said program and orders of tasks, and a display 16 with at least three lines, of which the first displays, at the moment in question, said functions of orders then allocated to said keys 17, the second displays the questions and messages edited by the electronic system as said program progresses and the third displays the reply and the order entered in by the operator.

In this way, even if the data of the program contained in the memory 11 are changed and if functions are added, such as additional tools or sensors, it is not necessary to modify said console: it suffices to change the displays on the screen and the allocations of the keys 17 of the keyboard possibly via the software. The latter may thus remain limited to six principal keys, as, if it is necessary to control other functions, it suffices to allocate to the same key other possibilities of orders and to display sequentially and simultaneously to the operator the legend and the corresponding significance.

Furthermore, said monitoring console 15 may comprise a location 30 for connecting thereto said interchangeable recording support 24 in order to simplify interchangeability thereof by the operator.

The console also comprising other known monitoring keys and signals 33 such as general supply, alarms, monitoring of the batteries, etc...

There may also be disposed a connecting plug 34 for connecting thereto an outer terminal able to dialogue with the electronic system 8 to effect tests and/or to make modifications to the data of the basic program recorded in memory 11.

Finally, said control console 15 may include a microprocessor which manages the information entered by the operator in this console and that generated by the electronic system 8 for the display 16 and the allocation of the functions of the keyboard 17, which microprocessor replaces the specific interface card $13_6$ and allows the connection of said console 15 by a series line directly to the microprocessor 10.

Figure 4:
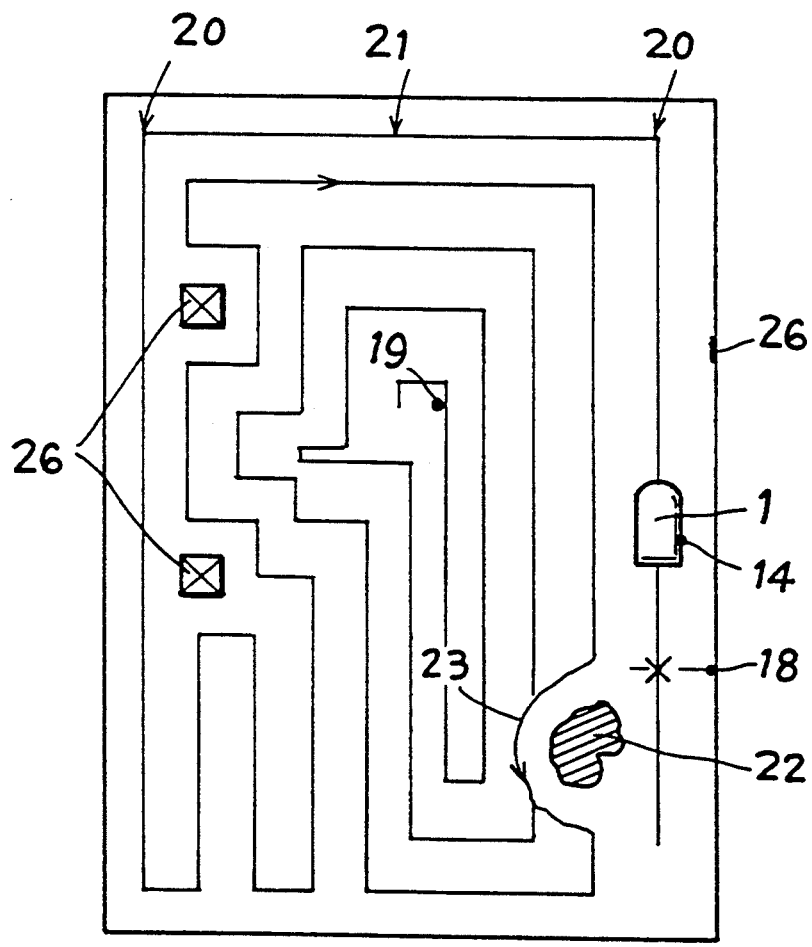

FIG. 4 is an example of path and of task recorded and learnt by the apparatus 1 as described hereinabove and re-performed as required.

To that end, according to the process of the invention and in a preferred embodiment, beacons 26 are disposed on surfaces such as pillars or walls near the ground area 19 to be cleaned, and in a sufficient number for any place on this ground area to be in direct range of at least 2 beacons, if not 3. The apparatus 1 is brought in free mode, without using its capacities of recording or of reproduction, to a chosen fixed reference point 18 or upstream thereof on which the initialization sensor 14 is set at a given position and distance. The mode of manual piloting and of recording is then set off by one of the keys of the keyboard 17, managed by the program previously loaded in said memory 11 of the micro-computer 10, which transmits the orders to all the input-/output interface cards of the propulsion equipment and cleaning tools.

The apparatus 1 is directed manually by the control levers 6 of the console so as to cause it to follow the desired path 21 for example along a partition, around pillars and at the centre of the premises. To follow the partition, one may pass to servo-control mode so that the apparatus guides itself on the latter as described previously. The operator activates, via said keyboard 17, the appropriate cleaning tools as desired depending on the place where he is located, and all the information returning from the sensors monitoring the equipment and positions, and each specific point 20 of the path and start-up and stop and of tools and change of mode (manual/free, wall-follow, manual/recording...) are recorded progressively in said erasable memory 12 of said micro-computer.

At the end of this manual learning, the apparatus is replaced opposite said reference point 18 until its position of beginning of learning is re-initialized by using for example the wall-follow mode and one then passes into automatic execution mode: the apparatus re-performs by itself the displacements and cleaning operations as memorized and following the path 21 recorded. During this phase of execution, the apparatus permanently scrutinizes its environment especially in front, thanks to distance sensors 9 of which at least 7 are disposed towards the front, which then detect any obstacle which was not there during the learning phase, and if it hinders the path, the apparatus stops. If it has been chosen to program this possibility previously, the electronic system may then cause an avoidance procedure to be effected by execution of a wall-follow mode along said obstacle 22 along a predetermined side until the memorized path has been intersected again, which it may then resume.

This path-follow is effected with very little deviation and error in reproduction, on the one hand thanks to any known system for monitoring the revolutions of the driving wheels 3 which makes it possible by integration to know exactly the distance covered and to reproduce the curves with exactitude and, on the other hand, thanks to the known positioning system 25 on-board the apparatus. The latter notes the distances of the apparatus from the beacons 26, at any instant and especially at each specific point 20, whether it be in learning mode for recording or in execution mode for verification, by comparison, between this recording and the real path, in order to have the possible necessary corrections made. In this way, after 4 hrs. cleaning operation, tests have demonstrated that the final deviation in position is much less than 20 cm, which is compatible with the clearances of the tools and obstacle sensors and never blocks the apparatus.

The present invention is not limited to the embodiment described hereinabove and which constitutes only examples of devices and of processes according to the invention: modifications and variants may be made within the scope thereof in particular in the choice of the positioning equipment 25, the electronic system 8 and the program for execution and piloting.

We claim:

1. Autonomous apparatus for automatically cleaning ground areas, comprising a support frame of the type comprising known tools adapted to said cleaning, propulsion and steering means by wheels, an electrical supply by on-board battery, various converters and relays, and control levers allowing operation of said tools and said propulsion and steering means, which apparatus is covered with a protecting body and comprises an electronic system of micro-computer type composed of at least one microprocessor, a fixed read-only memory, an erasable memory and various input-/output cards connected in particular to the various components allowing operation and start-up of said tools and propulsion and steering means, fixed distance monitoring sensors and at least one initialization sensor, which sensors are connected to at least one of said input/output cards and are placed on said protecting body, further comprising a console on which said control levers are grouped, said console presenting a display and a keyboard, and said console being connected to a specific input/output card of the microprocessor, which read-only memory of the electronic system is loaded with a program ensuring, on the one hand, permanently and in known and automatic manner, the management of all the input/output interface cards and of all the equipment connected to said cards, and on the other hand, as required and successively in several places and for different tasks, a learning phase by memorization of a cleaning task made manually in a first step, then a phase of execution by repetition of this recorded cleaning task, and this in automatic manner even in the case of an unexpected obstacle detected by said distance monitoring sensors and from the same reference point on which said initialization sensor is reset at the beginning of each execution of the same task on the same learnt path, which apparatus comprises a known positioning system compatible with fixed reference beacons located near the ground area to be cleaned and from which, and at any chosen moment, said apparatus is positioned on said ground area.

2. The autonomous apparatus for automatically cleaning ground area of claim 1, wherein said erasable memory is constituted by a copy card on which is connected any interchangeable recording support of magnetic diskette type or other erasable memory of "RAM" type so that several tasks may be recorded and reproduced by simple change of said erasable memory support.

3. The autonomous apparatus for automatically cleaning ground areas of claim 1, comprising a video camera of any known type and a wave emitter for transmitting images taken by said camera to a monitoring station presenting a compatible receiver.

4. The autonomous apparatus for automatically cleaning ground areas of claim 1, wherein said console for monitoring and controlling the apparatus comprises at least one forward and reverse operation lever, a right and left direction change lever, a keyboard with at least six keys for monitoring the functions of said program of orders of tasks, and a display of at least 3 lines of which the first displays at the moment in question said functions and orders then allocated to said keys, the second displays the questions and messages edited by the electronic system as said program progresses and the third displays the reply and the order entered by the operator.

5. The autonomous apparatus for automatically cleaning ground areas of claim 1, wherein said monitoring console comprises a location for connecting said interchangeable recording support thereto.

6. The autonomous apparatus for automatically cleaning ground areas of claim 1, wherein said on-board batteries ensuring electrical supply deliver a voltage of 48 volts and allow normal operation of the apparatus for at least 4 hours.

7. The autonomous apparatus for automatically cleaning ground areas of claim 1, including a lateral brush mounted on an extensible arm wherein the extensible arm of the lateral brush is such that it ensures a sweeping along a wall at about 30 cm from the apparatus, which distance being monitored by at least three fixed distance monitoring sensors located on the same side and allowing servo-control of the path of the apparatus, such that its axle remains parallel along said wall and at constant distance.

8. The autonomous apparatus for automatically cleaning ground areas of claim 1, wherein said control console includes a microprocessor which manages the information entered by the operator in this console and that generated by the electronic system for the display and the allocation of the functions of the keyboard, which microprocessor replaces the specific interface card and allows the connection of said console by a series line directly to the microprocessor.

9. The autonomous apparatus for automatically cleaning ground areas of claim 1, wherein the separation surfaces between the front part of the tool unit and the rear part may be in the form of staircase constituted for example by chassis plate with a plane step receiving the bearing efforts comprising a system for centering and retaining between the two parts of which one contains for example at least one female part and the other a compatible male piece.

10. The autonomous apparatus for automatically cleaning ground areas of claim 1, comprising a manoeuvering handle retractable in the body and associated with a disengagement control which automatically disengages the driving wheels when said handle is pulled in order to disengage it from said body.

* * * * *